Feb. 26, 1963    C. H. SCHLESMAN    3,078,728
FLUID DRIVEN GYROSCOPE
Original Filed April 11, 1950

Inventor
C. H. Schlesman 3,078,728
FLUID DRIVEN GYROSCOPE
Carleton H. Schlesman, Washington, D.C., assignor to the United States of America as represented by the Secretary of the Navy
Original application Apr. 11, 1950, Ser. No. 155,316, now Patent No. 2,852,208, dated Sept. 16, 1958. Divided and this application Feb. 7, 1955, Ser. No. 486,741
7 Claims. (Cl. 74—5)
(Granted under Title 35, U.S. Code (1952), sec. 266)

The present invention relates to gun-launched rotating missiles and like ordnance devices and more particularly to a novel and unique gyroscope utilized in an apparatus employing a gyro-stabilized reference for telemetering from the missile in flight instantaneous signals indicative of the declination angle and rotational position in space of the missile.

This application is a division of my copending application Serial No. 155,316, filed April 11, 1950, and now Patent No. 2,852,208.

It has been found difficult in prior art devices for use in shells or missiles to transmit therefrom accurate signals indicative of the instant declination angle and rotational position in space of the missile throughout the flight thereof. The present invention is well suited for such use and is of particular advantage for indicating the angle of declination and for controlling the time of firing of the steering charge of rotating missiles in relation to the rotational position thereof. Such a missile containing a steering charge for providing a change in course of the missile upon firing of the charge is disclosed and claimed in the copending application of Harold J. Plumley for Method and Apparatus for Steering a Gun-Launched Missile, filed December 6, 1949, Serial No. 131,441.

The device of the preesent invention comprises a preferably gas or air driven gyroscope having its principal rotating axis aligned with the rotating axis of the missile at the time of launching. The gyro rotor, however, is especially constructed and arranged to provide for tilting of the rotor with respect to the missile as the declination angle thereof varies during flight. In order to protect the gyroscope from the high acceleration forces to which it is subjected during the launching of the missile, the gyroscope rotor is supported in such a manner that damage thereto by such forces is substantially nullified. To this end, the supporting means is arranged to release the gyroscope rotor when the acceleration forces are reduced to a point where the gyroscope may be operated without damage thereto.

A pair of electrodes or capacitor plates are fixedly arranged at diametrically opposite points adjacent the periphery of the rotor of the gyroscope in such a manner that as the gyroscope tilts with respect to the casing, the capacitance between the electrodes or plates and the rotor varies proportionally to the degree of tilt of the rotor axis away from the axis of rotation of the missile.

These variations in capacity are utilized in a bridge circuit to produce sinusoidal amplitude alternations which preferably are transmitted by way of the telemetering link as frequency changes in the signals transmitted from the missile and receivable by suitable apparatus at the launching point. The sinusoidal amplitude alternations are reproduced at the launching point, by any suitable signal reproducing equipment such as disclosed in my copending application Serial No. 155,316, and utilized to visually indicate declination angle and instantaneous rotational position of the missile.

An object of the present invention is to provide a novel gyroscope for a telemetering apparatus whereby information relative to the declination angle and the instantaneous position in space of a missile or shell in flight is effectively transmitted to the launching point thereof.

Another object is to provide a new and improved gyroscope for varying the capacity of a bridge circuit in accordance with the variations of the declination angle of a missile or shell whereby a transmitter is influenced thereby to effectively transmit a signal indicative of such variations to the launching point.

Still another object is to provide in a gun-launched missile a new and improved gyroscope which is not susceptible to damage from high acceleration forces to which it is subjected during launching of the missile.

Other objects and many of the attendant advantages of this invention will be readily appreciated as the same becomes better understood by reference to the following detailed description when considered in connection with the accompanying drawings wherein:

FIG. 5 is a diagrammatic view of the signal transmitting system employed in the missile.

Figure 1:
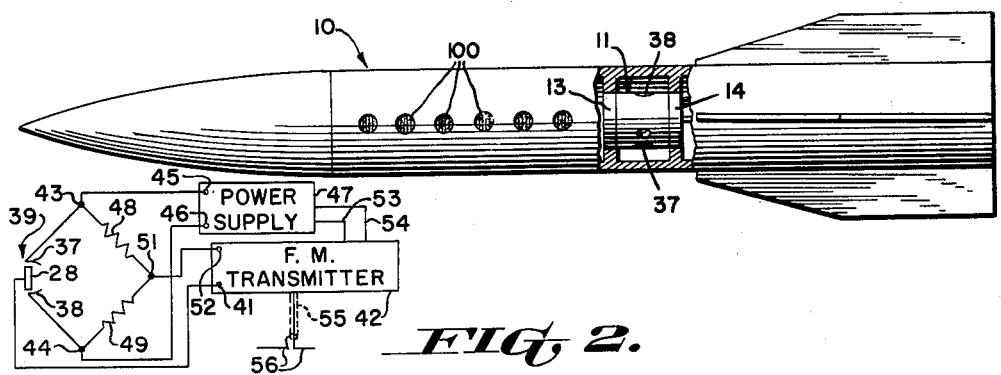
FIG. 1 is a view in side elevation of one of a variety of missiles in which the gyroscopic device of the present invention may be employed.

Referring more particularly to the drawings wherein like characters indicate like parts throughout the several views, 10 indicates generally a missile containing a differential gyroscope indicated generally at 11 having the principal axis thereof coincidential to the longitudinal axis of the missile. A tubular casing 12 is closed at the ends thereof by massive closures 13 and 14, each of the closures being secured to casing 12 by a plurality of screws 15.

The closures 13 and 14 are respectively provided with an axial bore 16, the outer end of each of the bores being closed respectively by a spring support 17 which is secured therein by a locking washer 18. Slidably mounted in each of the bores 16 is a bearing race 21 having a plurality of balls 22 therein. Springs 19 are mounted between the races 21 and the spring supports 17.

A shaft 23 having the tapered ends 24 thereof rotatably mounted in the balls 22, has a pair of diametrically opposed radial bores 25 at a point midway the ends thereof. A ring 26 is suspended around the shaft 23 by means of a pair of screw pivot pins 27 threaded therein and extending into the bores 25. A pair of tapered bores 30, positioned at 90° from pins 27, are formed in the ring 26.

A rotor 28 is pivotally mounted on ring 26 by means of a pair of tapered pins 29 extending into the tapered bores 30 and supported in bores 31 of the rotor 28. Pins 29 are held in bores 31 by means of screws 32 threaded into the outer ends of the bores. From the foregoing it is apparent that the rotor 28 is mounted for rotation with the shaft 23 and has a limited amount of angular motion with respect to the shaft about the pivot axes formed respectively by pins 27 and 29.

The rotor 28 has a plurality of turbine buckets or depressions 33 in the periphery thereof. A tube 34 is arranged within casing 12 to direct a jet of high pressure gas such, for example, as carbon dioxide against the buckets 33 to drive the rotor 28 at high speed. Tube 34 is connected to a gas container 35 through an inertia operated gas release mechanism 36 which is arranged to puncture a diaphragm to release the gas into the tube 34 by reason of the setback force imparted to the inertia member by the launching operation, thereby to drive the rotor. It is, of course, understood that the rotor also may be driven by a jet of air picked up by a scoop on the outer periphery of the missile casing, or by any well-known means.

Positioned within casing 12 and adjacent the periphery of rotor 28 are the electrodes or plates 37 and 38 which, with the rotor, comprise a pair of capacitors in a capacity bridge circuit indicated generally at 39 in FIG. 5, as will be hereinafter more fully described.

FIG. 5 illustrates in diagrammatic form a circuit of electronic apparatus carried in the missile for use with the gyroscope of the present invention and in which the gyroscope rotor 28 and the electrodes or plates 37 and 38 are shown as elements in the capacity bridge circuit 39, the rotor being connected to terminal 41 of a frequency modulated transmitter 42 while the electrodes 37 and 38 are connected at points 43 and 44, respectively, by individual leads to output terminals 45 and 46 of a power supply 47. Resistors 48 and 49 are respectively connected at points 43 and 44 at one side thereof while the other side of the resistors are interconnected as at 51. Point 51 is connected to terminal 52 of the transmitter 42. Power supply 47 and transmitter 42 are interconnected by leads 53 and 54. Transmitter 42 has connected thereto by coaxial cable 55 a dipole antenna 56.

In order to prevent damage to the gyroscope mechanism during the gun launching operation of the missile, provision is made for supporting the rotor while the extremely high acceleration forces accompanying such operation are present in the missile. During the launching operation the rotor comes to rest against a plurality of supporting pins 57 mounted in the rearmost one of the closures 13 and 14. The setback force acts on the rotor, shaft, and bearings to compress one of the springs 19 which in turn brings the rotor into contact with the pins 57. This supports the weight of the rotor and thereby avoids damage by the rotor to the bearings, pivot pins, ring, and shaft. This arrangement, also, prevents the rotor position with respect to the missile axis from being disturbed by the initial violent erratic motion of the missile during the launching thereof.

Figure 2:
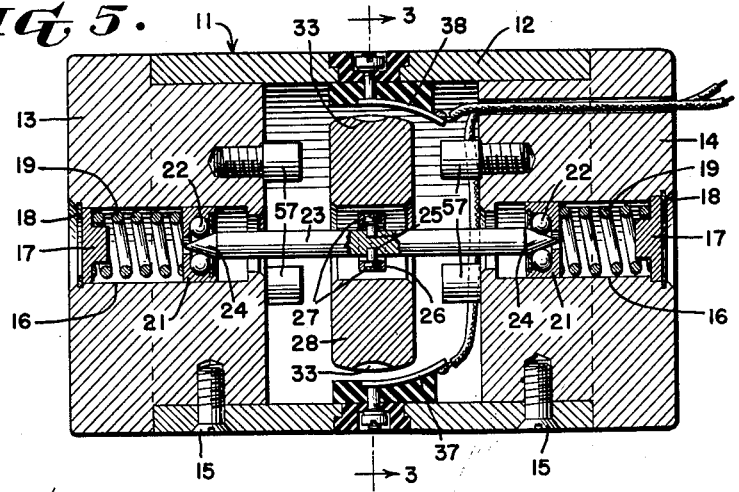
FIG. 2 is a sectional view taken along the axis of the device and showing the gyroscope of the present invention.
Figure 3:
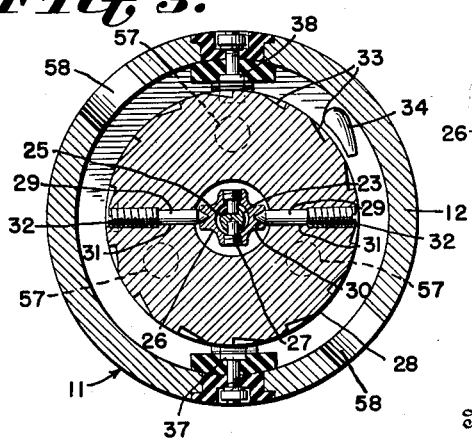
FIG. 3 is a sectional view on line 3—3 of FIG. 2.
Figure 4:
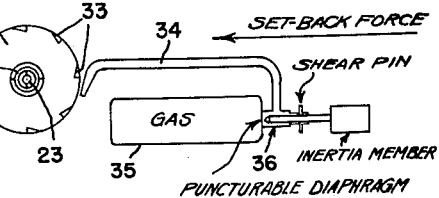
FIG. 4 is a schematic view of the means for driving the gyroscope.

As is apparent in FIG. 2 of the drawings, the endwise movement of the rotor assembly is limited by the pins 57 mounted in both of the closures 13 and 14. When the acceleration forces have dissipated, the rotor assembly returns to its normal position.

During acceleration the inertia operated diaphragm puncturing means 36 initiates the flow of gas from container 35 through tube 34 to the turbine buckets 33 in the periphery of rotor 28. When the rotor, as aforesaid, moves back to its normal position the rotor is driven by the gas at high speed, thus acting as a gyroscope. In order to allow for the escape of the gas from casing 12 one or more ports 58 may be provided in the casing.

In operation, declination of the missile from the original launching angle changes the relative positions of the rotor 28 and the electrodes 37, the rotor axis being aligned with the missile axis at the time the rotor is set in operation, thereby to vary the capacitance between the electrodes and rotor to unbalance the bridge circuit in proportion to the change in the declination angle.

The fin structure of the missile is such as to cause the missile to rotate at a speed of approximately 600 r.p.m., for example. Thus, as the declination angle of the missile changes in response to the force of gravity thereon, the bridge circuit, which is initially balanced, develops in the output thereof an alternating signal voltage as the capacitive coupling of the electrodes with respect to the rotor alternately increases and decreases during successive revolutions of the missile, the amplitude of the alternating signal being proportional to the declination angle and the polarity of the signal being indicative of the instantaneous rotational position of the missile. Thus, assuming that the steering jet openings 100 on the missile are at zero degrees and the electrodes 37 and 38 are at 90° and 270° respectively, and assuming further that the electrode 37 is uppermost during positive half cycles of the alternating signal of the bridge, the steering jet will be on the starboard side of the missile when the signal reaches the peak of the positive half cycle.

The alternating signal is transmitted to the launching point by way of the telemetering link comprising the F.M. transmitter 42, coaxial line 55, and dipole antenna 56. The carrier of this telemetering link is utilized to transmit the bridge signal, the carrier for this purpose being either amplitude modulated or frequency modulated, preferably the latter, by suitable well known apparatus included in the transmitter.

While the device of the present invention has been described and illustrated as being employed in a gun-fired rotating missile or shell, it is contemplated that the device may have other applications such, for example, as in any moving body where it is desirable to be informed at a remote position of the rotational position and deviations in the angle of the body during the travel thereof.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed and desired to be secured by Letters Patent of the United States is:

1. In a fluid driven gyroscopic apparatus for use in a gun-launched missile, in combination, a gun-launched missile, a tubular casing, a pair of massive closures having axial bores individual thereto and secured to the ends of said casing, each of said bores having an enlarged outer end portion and a reduced inner end portion, a pair of spring seats fixedly mounted in the enlarged end portion of said bores respectively, coiled springs respectively arranged in said bores against said seats, bearing members respectively engaging said springs and slideable within said bores, an undivided shaft pivotally mounted for rotating in said bearing members and movable axially therewith, said shaft being of sufficient length to normally compress said springs to approximately half of the maximum compression thereof, said bearing members being urged against the ends of said shaft by said springs whereby the bearings will follow the shaft during axial movement thereof, an annular rotor, a gimbal for pivotally mounting the rotor on said shaft intermediate said bearing members, and stop means on each of said massive closures for engaging and arresting axial movement of said rotor in a position normal to the axis of said shaft when the shaft has been moved axially by set-back force from an initial position of rest to a moved position during the gun launching of said missile.

2. In a fluid driven gyroscopic device for use in a gun-launched missile comprising, a tubular casing, a pair of massive closures having axial bores individual thereto and secured to the ends of said casing, each of said bores having an enlarged outer end portion and a reduced inner end portion, a pair of spring seats fixedly mounted in the enlarged end portion of said bores respectively, springs respectively arranged in said bores against said seats, bearing members respectively engaging said springs and slideable within said bores, an undivided shaft pivotally mounted for rotary movement in said bearing members and slideable axially therewith, said shaft being of sufficient length to normally compress said springs to approximately half of the maximum compression thereof, said bearing members being urged against the ends of said shaft by said springs whereby the bearings will follow said shaft during axial movement thereof, an annular rotor encircling said shaft, a gimbal for pivotally supporting the rotor on said shaft intermediate said bearing members, a plurality of stop pins arranged on the inner face of at least one of said closures for engaging and arresting axial movement of the rotor as the set-back force is applied thereto during the gun-launching of said missile thereby to prevent damage to said gimbal by said force.

3. A fluid driven gyroscope for use in a gun-launched missile comprising, an annular body having an axial bore therethrough and a pair of radial diametrically opposed bores communicating with said axial bore, a first pair of supporting pins mounted in said radial bores and extending into said axial bore, a gimbal ring disposed within said axial bore and supported by said first pins, said gimbal ring having a central bore, a second pair of diametrically opposed pins spaced 90° from said first pins and mounted in said gimbal ring, said last named pins extending into said central bore of the gimbal ring, an undivided shaft pivotally mounted for rotation and axial movement from an initial position of rest, said shaft extending through the central bore of said gimbal ring and having a pair of diametrically opposed radial bores therein, said second pair of pins extending respectively into the bores in said shaft, means on the periphery of said body and responsive to fluid pressure impinging thereon for rotating said body, means including a pair of coiled springs disposed at opposite ends of the shaft for yieldably maintaining said annular body and shaft in said initial position until moved axially therefrom to a moved position by set-back force during the gun launching of the missile, and a plurality of stop pins engageable by said body for arresting further axial movement thereof when the body and shaft have been moved to said moved position.

4. In a fluid driven gyroscopic apparaus for use in a gun-launched missile, a casing having a longitudinal axis, a pair of bearing members resiliently mounted in said casing for movement in either direction along said axis, a shaft pivotally mounted for rotation in said bearing members and axially movable therewith, a gimbal secured to said shaft intermediate said bearing members, a rotor mounted by said gimbal for rotation with said shaft and movable axially therewith means on the periphery of said rotor for rotating said rotor at high speed in response to fluid pressure applied thereto, and a plurality of stop pins projecting interiorly of the ends of said casing and normally in spaced adjacency to each side fare of said rotor whereby axial movement the rotor is arrested by forcible engagement with said pins when a sudden force is encountered along the axis of said casing of sufficient force to move the rotor along said axis into contact therewith.

5. A fluid driven gyroscope for use within a gun-launched missile comprising, a tubular casing having a pair of massive closures secured to the ends thereof, each of said closures having an axial bore therein, a pair of spring pressed seats mounted within said bores, a pair of bearing members respectively disposed within said bores and slideable axially therealong, a shaft pivotally mounted in said bearing members and movable axially therewith, a pair of coil springs for yieldably urging the bearing members into contact with the end portions of said shaft whereby the bearings follow the shaft during axial movement thereof from an initial position of rest, an annular mass disposed about said shaft, said mass comprising two parallel plane surfaces and a segmented peripheral portion disposed therebetween, a gimbal disposed within said annular member for supporting the member on said shaft whereby the member is tiltable in any direction with respect thereto, a plurality of turbine buckets formed along the outer peripheral portion of said rotor, means for emitting a fluid under high pressure against said bucket thereby to drive the rotor at high speed and means on said massive closures engageable by said mass for arresting axial movement of the mass in a position normal to said shaft when the mass has been moved a predetermined distance axially from said position of rest by set-back force during gun-launching of the missile.

6. A gyroscope according to claim 5 including a curved capacitor element disposed within said casing in closely spaced adjacent relation with said buckets and providing with means for establishing an exteranl electrical connection thereto whereby a high speed variation in capacity between said motor and capacitive element is obtained as the rotor rotates, and the axis of rotation of the shaft is varied from the axis of rotation of the rotor.

7. A gyroscope according to claim 5 including a pair of capacitative elements disposed in diametrical relation with said rotor and closely spaced to said buckets in such manner that variations in capacity between one of said elements and the rotor bears an inverse ratio to variations in capacity between the other of said elements and said rotor as the rotor is tilted from a plane normal with respect to said shaft, and means for establishing an external electrical connection to each of said elements.

References Cited in the file of this patent

UNITED STATES PATENTS

| | | |
|---|---|---|
| 995,819 | Walker | June 20, 1911 |
| 1,569,545 | Junghans | Jan. 12, 1926 |
| 1,850,068 | Ballman | Mar. 22, 1932 |
| 2,047,186 | Bates | June 14, 1936 |
| 2,269,103 | Harding et al. | Jan. 6, 1942 |
| 2,328,670 | Parker | Sept. 7, 1943 |
| 2,352,469 | Carlson | June 27, 1944 |
| 2,584,125 | Haglund | Feb. 5, 1952 |
| 2,591,921 | Cosgriff et al. | Apr. 8, 1952 |
| 2,620,668 | Lundberg | Dec. 9, 1952 |